July 24, 1951  K. G. COMPTON ET AL  2,561,462
ELECTROMAGNETIC CORE AND MANUFACTURE THEREOF
Filed Nov. 30, 1944  7 Sheets-Sheet 1
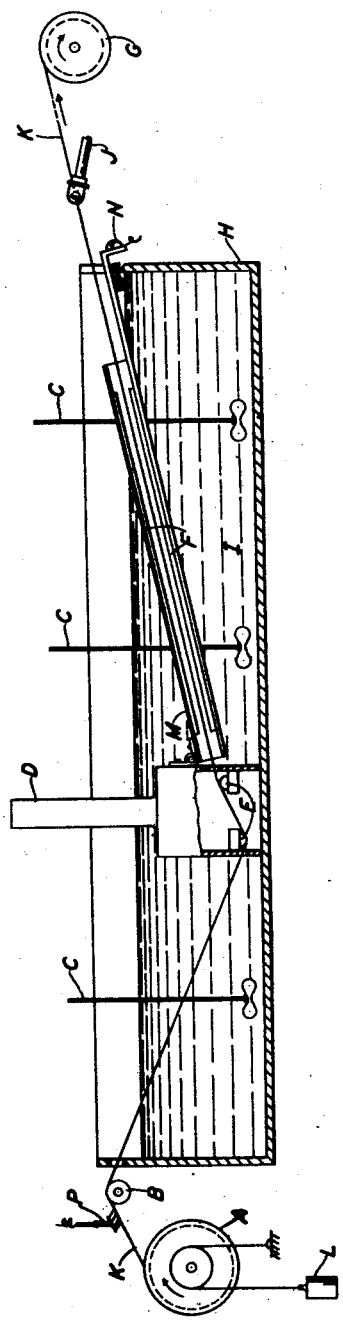
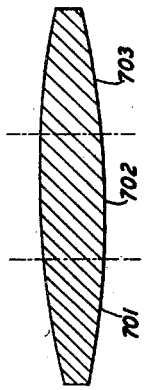
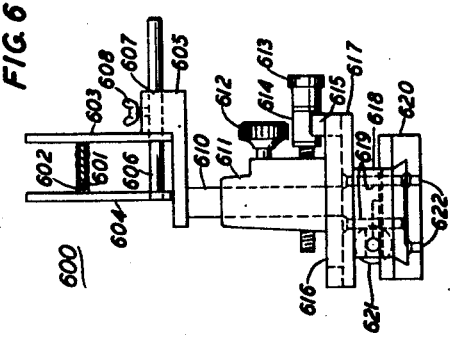
INVENTORS: K. G. COMPTON
H. L. B. GOULD
BY John E. Cassidy
ATTORNEY

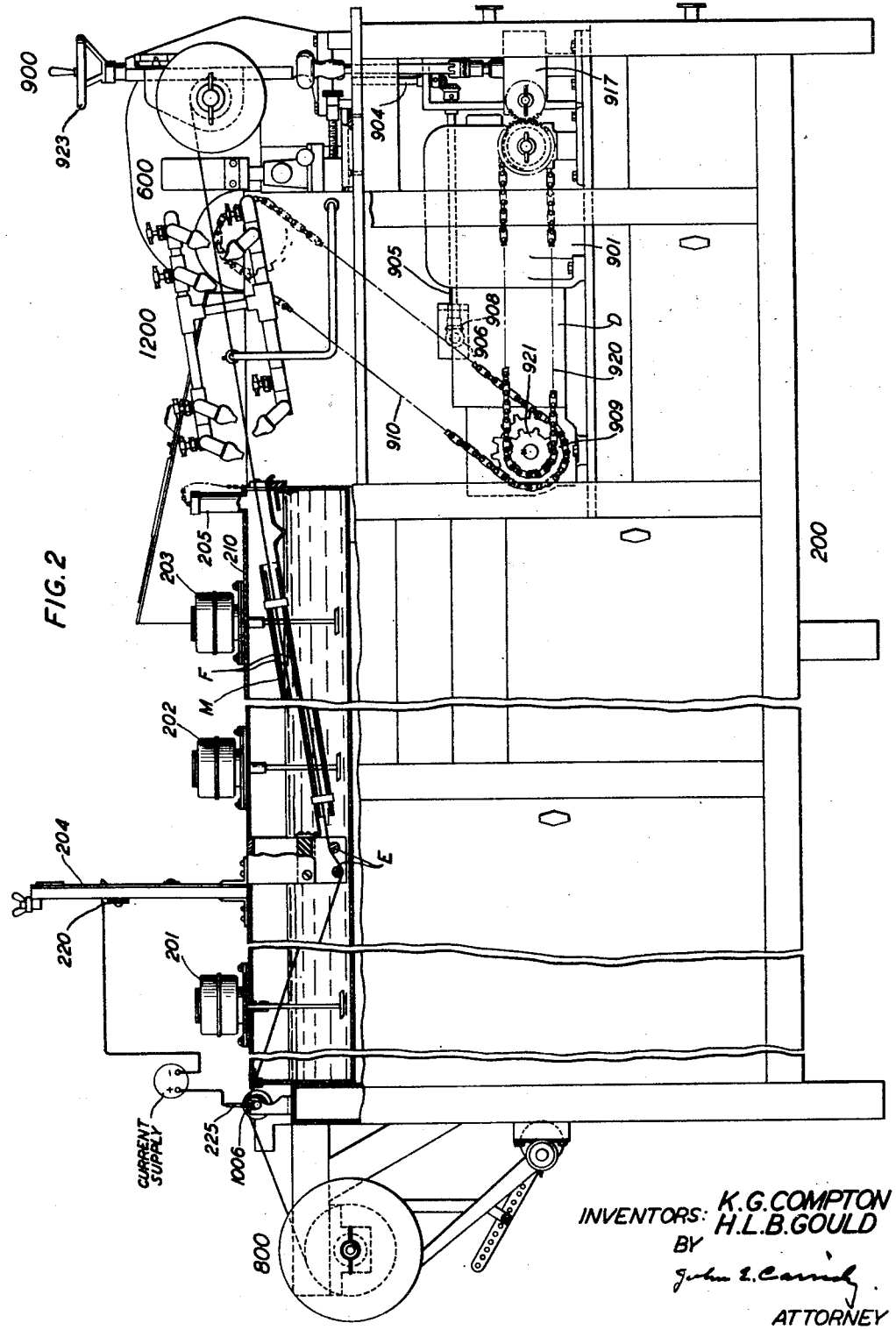

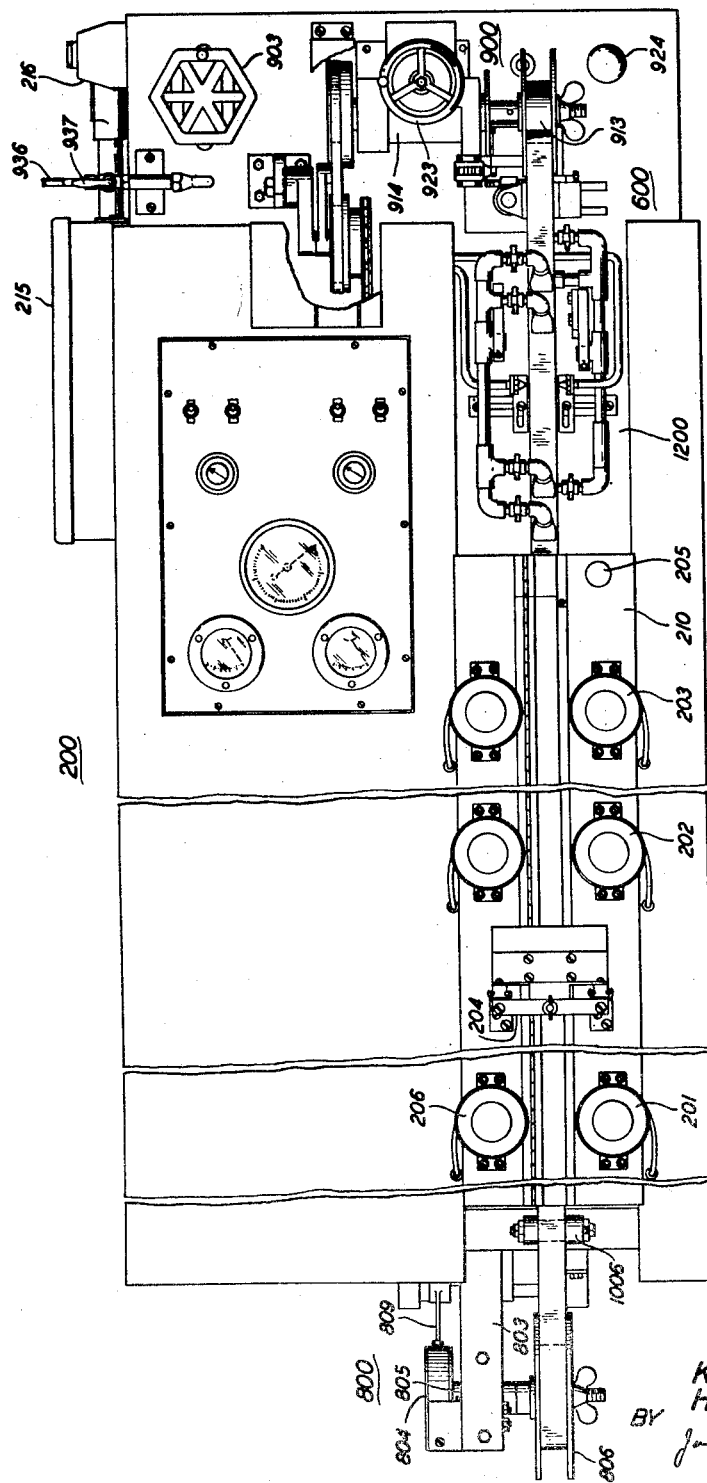

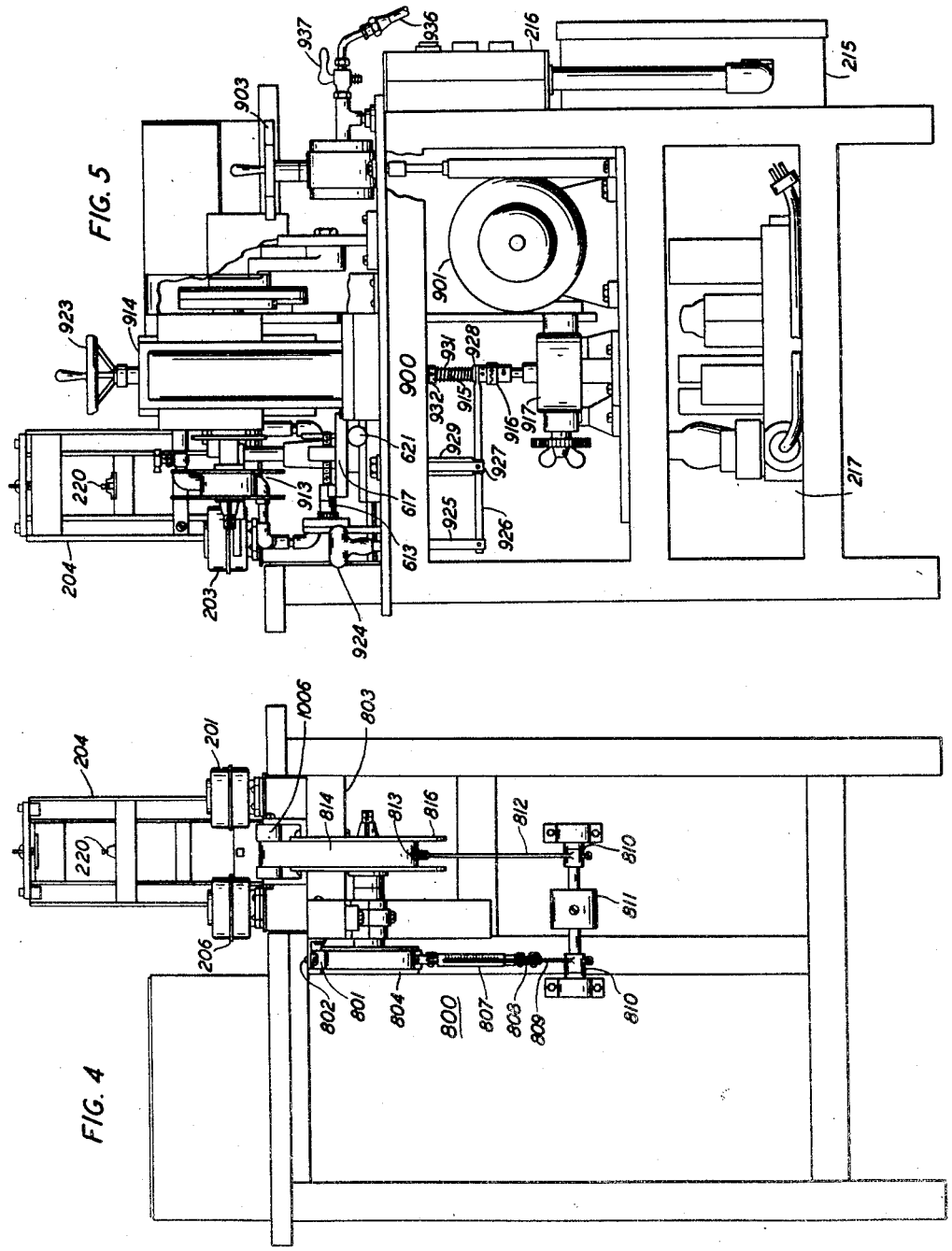

July 24, 1951     K. G. COMPTON ET AL     2,561,462
ELECTROMAGNETIC CORE AND MANUFACTURE THEREOF
Filed Nov. 30, 1944     7 Sheets-Sheet 5
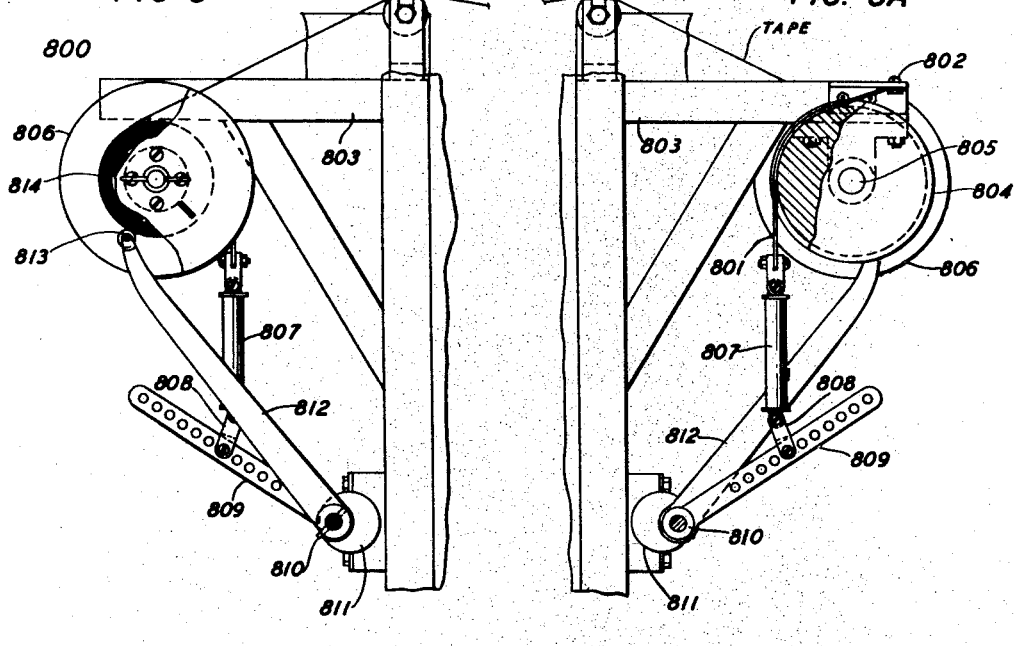
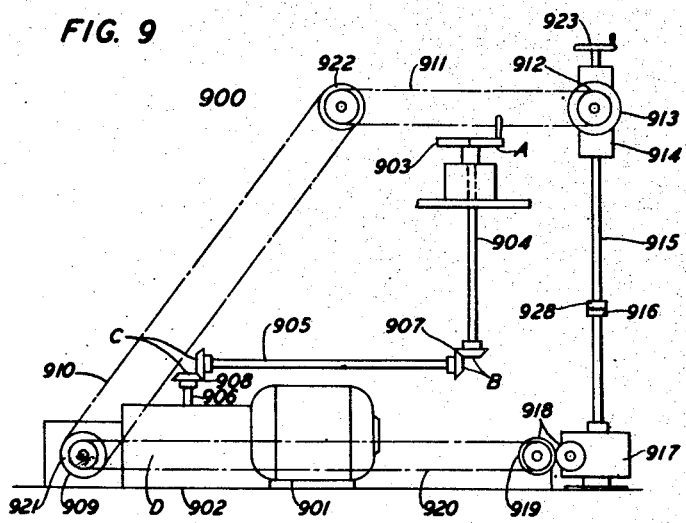
INVENTORS: K. G. COMPTON
H. L. B. GOULD
BY John E. Cairney
ATTORNEY

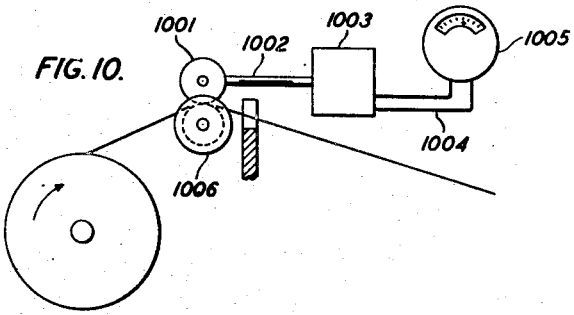
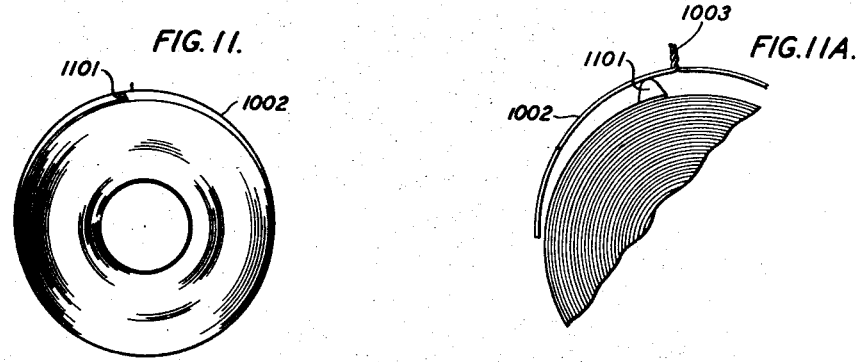
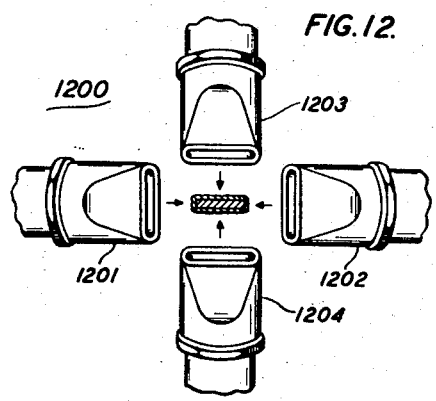

July 24, 1951  K. G. COMPTON ET AL  2,561,462
ELECTROMAGNETIC CORE AND MANUFACTURE THEREOF
Filed Nov. 30, 1944  7 Sheets-Sheet 7

INVENTORS: K.G. COMPTON
H.L.B. GOULD
BY: John E. Carroll
ATTORNEY

Patented July 24, 1951

2,561,462

UNITED STATES PATENT OFFICE 2,561,462

ELECTROMAGNETIC CORE AND MANUFACTURE THEREOF

Kenneth G. Compton, Summit, and Harold L. B. Gould, Montville, N. J., assignors to Bell Telephone Laboratories, Incorporated, New York, N. Y., a corporation of New York Application November 30, 1944, Serial No. 565,890

21 Claims. (Cl. 175—21)

This invention relates to the production of magnetic cores to which insulated windings may be applied for the production of transformers, impulse coils, modulating coils, harmonic producers, and similar purposes capable of being utilized to produce new technical results.

This application is a continuation in part of applicants' application Serial No. 391,302, filed May 1, 1941, now abandoned, which application was copending with the present application, and claim is made to all the equitable and legal benefits which flow from such fact.

In recent years the demand for high quality coils, especially those of exceedingly low hysteresis losses, has greatly outstripped the possibility of producing them and this condition has persisted for some time.

Prior to utilization of the methods of the present invention it was well recognized that eddy current losses in many kinds of magnetic bodies are highly undesirable. It was also recognized that in magnetic cores made out of sheets or strips the eddy current losses are approximately proportional to the cube of the thickness of the individual strips, assuming, however, that the strips are so insulated that except for occasional and isolated spots no eddy currents flowing from one strip to another occur. Stated in another way, the eddy current losses are in proportion to the cube of the thickness of the magnetic sheet, which leads to the desirability of employing extremely thin sheets of material, a fact which has been known for a long time. Furthermore, the eddy current loss in a magnetic core is proportional to the square of the effective permeability and also proportional to the square of the frequency.

Utilization of magnetic cores composed of extremely thin tape would, therefore, appear to be of obvious advantage. However, a consideration shows that the necessity of an insulation between the layers of tape or sheets is vital if advantage is to be taken of subdividing the metal into thinner sheets. This insulation may generally be considered as having different properties than the kind of insulation applied to current carrying wires. Current carrying wires are insulated to withstand relatively high voltages and while the thinness of insulation may often be a factor the use of the word thinness in connection with such wires implies a different order of thinness than will be used hereinafter in discussing the thinness of a layer of insulation between magnetic sheets or the turns of magnetic tape comprised within a core. For one reason, in insulating a wire it is ordinarily true that the insulation must cover the wire at all points. In other words, the breakdown of the insulation at a single point results in complete unserviceability of the coil, transformer or other device to which the wire is applied and in connection with which the breakdown occurs. In insulating magnetic sheet, however, the problem is recognizably different in that the insulation is not required to withstand voltages as high as those which the insulation on wires is usually expected to withstand and, moreover, an occasional uninsulated spot of small area through which the current passes from one magnetic layer of material to the next adjacent layer does not materially impair the effectiveness of the coil. The main consideration is that such spots shall be relatively few, relatively small in area and relatively uniform in number and distribution. If they could be completely eliminated that would be desirable but their elimination at the expense of increased thickness of insulating layer or other factors would be unprofitable and, therefore, undesirable.

Returning to the use of magnetic tape or magnetic sheet of greater thinness, it will be observed from reference to the prior art that various methods of insulating layers of such tapes or sheets one from the other have been practiced. Among these have been the use of metallic oxide powders such as aluminum oxide. These substances have been employed for magnetic materials which require heat treatment at relatively high temperatures, for example, as high as 1200° or 1300° C. after being incorporated into magnetic cores because some oxides so used are highly resistant to the flow of electric current and relatively resistant to physical and chemical changes at such temperatures. Consequently, they have been utilized for insulating the layers of magnetic cores consisting of iron-nickel alloys containing nickel in the proportions of 30 to 85 per cent and iron the balance with additions of 1 to 7 per cent of substances such as molybdenum, chromium, copper, silicon and other similar metals often incorporated to increase the specific resistance of the composition itself because this also is a way to reduce the eddy current losses regardless of the thickness of individual layers. Other magnetic alloys which have been so insulated are those of the iron-nickel-cobalt class, including, for example, from 10 to 50 per cent iron, 5 to 80 per cent cobalt and the balance chiefly nickel. It has been found that such insulating layers produced by utilizing powders are not generally effective to produce a total space between the layers of magnetic material much less than about 0.001 in thickness. Other substances which have been used to insulate magnetic sheet include clay and talc applied either as powder or by dipping the magnetic sheet in a suspension of the finely divided material or running it through such a suspension. Some such substances react with magnetic materials at temperatures of around 700° to 1000° C., thereby producing undesirable results, and there is no knowledge on record that they have been found satisfactory for magnetic materials requiring heat treatment in case of coils made of such thin sheet as hereinafter mentioned in order to obtain a desired high packing factor.

It may be advantageous at this point to direct attention to the question of "packing factor." It has been shown above that increased thinness of sheet is obviously beneficial for use in magnetic cores where the eddy current losses are to be kept at a low value in cores working at exceedingly high frequencies. For sheet material of a thickness down to about 0.002 considerable advantage can be gained from decreasing the thickness of the sheet material even though the intervening layer including incidental air space is of the order of 0.001 inch. However, as the thinness of the sheet material decreases down to 0.001 inch or a minor fraction of 0.001 inch, it becomes apparent that the advantage gained by a further subdivision of the sheet is lost due to the fact that a greater and greater proportion of the available space is taken up by the insulating layer and its incidental air space. For this reason a core of a given volume of magnetic material requires more and more space as the magnetic material is subdivided into thinner and thinner sheets with the result that the space to be surrounded by the conductive winding on the core becomes bigger and bigger and little or no beneficial result is achieved; finally with further subdivision a poorer and poorer core is produced.

Another method proposed for separating by insulation the layers of sheets of magnetic material in a magnetic core is the production of natural oxides of the metal of the sheet on the surface of the metal. Thus, sheet material or tape material consisting of iron and nickel has been subjected to an oxidizing treatment with the expectation that a relatively non-conductive layer of a given nature will be produced. Such methods and products resultant therefrom have been used for certain applications with a measure of success but are entirely unsuccessful and insufficient, so far as known, for the production of magnetic cores having the characteristics which may be produced in accordance with the present invention.

Still other methods have been proposed. For example, the use of chromic oxide deposited or formed on the magnetic sheet material by one method or another and this also has been found to be undesirable and insufficient. Other proposals have included the use of silicates, such as calcium silicate, magnesium silicate and mixed silicates, which in substance amount to nothing more than the production of a sort of enamel upon the magnetic sheet, such as would be employed for insulating wire. Such materials may have a certain degree of effectiveness for thick sheet material, that is, material having a thickness of 0.006 to 0.050 inch and which require no heat treatment or only very low temperature heat treatment after being coated with the silicates. For example, the coating of silicon steel with such substances for the production of magnetic sheet material has been proposed. Although such methods and processes might have some virtue for certain purposes, they are highly unsuitable, insufficient and ineffective to enable the production of magnetic cores having the characteristics of those which may be produced by the apparatus, methods and processes of the present invention.

Subsequent to the making of the present invention it has come to our attention that others had previously proposed the use of silicates or other compositions composed wholly or partly of glass or a glassy substance, for insulating current carrying electric wire wound in coils upon transformer cores, but not, however, for insulating the sheets of the magnetic cores, and also such compositions were proposed as insulation for heating elements. Whereas such glass or silicate insulated wire might or may be found useful as the winding to be wound around or employed with magnetic cores according to the present invention, such insulations as have been proposed or suggested for the purpose heretofore are entirely ineffective and insufficient as insulations between the magnetic sheet. Among the reasons for this are that the compositions will melt, at the temperatures employed for heat treatment, and permit the magnetic sheet to come into contact with one another over various large and irregular layers, which will defeat the object in view, or that the layers are too thick or are insufficiently adherent or for other reasons. As will be stated hereinafter, the insulating coating applied to magnetic tape must be exceedingly thin for the reasons, first, that if both sides of a tape or sheet are coated, the total thickness of material between the two layers of tape is something more than twice the total thickness of the individual layer because owing to the entrapment of a certain amount of air and inevitable irregularities such increase of the space of the magnetic sheet to something over twice the thickness of the individual coating is inevitable. Furthermore, the coating of tape having a substantial flat area with a thin layer is more difficult than is the application of an equally thin layer to a very small wire of circular cross-section.

Mention may also be made of the fact that dust core coils widely employed in the communication art are or have been composed of finely divided magnetic dust insulated with any one of a great variety of insulating or semi-insulating materials and then compressed under great pressure to form magnetic cores. This dust core art offers nothing in aid of the solution of the present problem; the magnetic cores thus produced have low eddy current losses but their effective permeability is generally not over about 100 to 200 and, in fact, an effective permeability of 120 is said to be a relatively satisfactory value attributable to one type of core which is in very wide use.

In accordance with the present invention, it is desired to obtain effective initial permeabilities running as high as tens of thousands in many instances. A core having a permeability of only 100 to 200 would require a magnetic core of such dimensions and weight, which in turn would require a winding of such dimension and containing so great a length of wire and surrounding a space of so great volume that it would be useless or ineffective for most, if not all, of the purposes for which cores made according to the principles of the present invention are designed to be used.

Among the objects of the invention are to produce magnetic cores made of sheet material much thinner than have been found practical or useful prior to the present invention; to produce such cores having a packing factor much greater than that producible by previously known methods; to reduce the number and area of conductive spots between layers of the lamination of such cores; to make such cores more cheaply, uniformly, reliably and rapidly and by the aid of personnel of less skill and training than would otherwise be the case.

With respect to packing factor, it may be pointed out that, in accordance with the prior art, in the manufacture of laminated magnetic cores made of sheet having a thickness of 0.005 inch, a packing factor of about 0.75 has been achieved, and in the case of laminations of a thickness of 0.001 inch, a packing factor of about 0.4 has been achieved. It will be apparent that in the latter case the insulation between the layers occupies more space than the magnetic material. Hence, further subdivisions of the magnetic material into thinner sheets would result in cores having an increasingly disproportionate amount of space occupied by insulating material and less of magnetic material. Hence, it would become extremely difficult under these conditions and with an insulating layer which gives this degree of packing factor to achieve any beneficial results by employing thinner sheet. Thus, for example, if a particular kind and thickness of insulating layer is employed with magnetic material 0.001 inch thick to achieve a packing factor of 0.4, the use of a similar kind and thickness of insulating layer with laminations 0.0005 inch thick would result in a packing factor of only 25 per cent or 0.25.

However, it is an object of the present invention to produce and in accordance with the invention magnetic cores have been and are being produced with a packing factor greatly in excess of these values. Simple calculations will show that at high frequencies and with extremely high permeability material such cores are enormously more effective as the thinness of the magnetic sheet is reduced, with the packing factor remaining unchanged, or as the packing factor is increased for material of the same thickness, and if the packing factor is increased at the same time the thickness of the sheet is decreased, which is readily achievable in accordance with the invention, the results are even more beneficial.

It is, therefore, an object of the invention to produce, and such products are likewise a feature of the invention, magnetic cores made from tape having a thickness of approximately 0.000125 inch with a sufficiently high packing factor as to justify rolling the tape to such a degree of thinness, and, for example, magnetic cores consisting of tape having a thickness of 0.0005 inch having a packing factor ranging from 70 per cen to 90 per cent. In a particular application a packing factor of 80 per cent is considered sufficient and satisfactory. Also, in accordance with the principles of and the use of the apparatus and methods of the invention, magnetic cores composed of tape of a thickness of 0.002 have been made with a packing factor up to 94 per cent, although for a particular application average requirements run only around 92 per cent.

Furthermore, these objects were achieved by use of the methods and apparatus inherent in the present invention only after others had failed to achieve the desired results after trying a number of different methods shown in the art without success.

Before setting forth other features and objects of the invention, an exemplary embodiment of equipment for practicing the invention will be outlined. This equipment consists of apparatus for the electrophoretic or cataphoretic deposition of silicic acid on both sides of strands of tape composed of electromagnetic material. The apparatus consists of a bath or tank of silicic acid in suspension in acetone. The bath may be maintained stirred and may usually be operated at room temperature. The tape is drawn into the bath for a certain distance and then drawn over wipers which consist of polished stainless steel for wiping both sides thereof and then it continues through the bath between closely spaced equipotential electrodes which are preferably wider than the tape. The tape passes out of the bath and is wound directly upon (a) a spool to form a core of toroidal or hollow square or hollow rectangular shape which will be heat treated without unwinding to form a self-sustaining coil or (b) in the case of exceedingly thin tape the tape may be wound temporarily upon a metallic spool upon which it may be heat treated and from which it may be later unwound and wound into small cores. Before passing to the reel or spool in either case the coated tape is passed by nozzles through which an airblast is caused to impinge upon the tape for two principal purposes, namely, to redistribute the coating to a certain extent over the tape and eliminate an extra thickness of the coating which tends to accumulate near the edges and, second, partly or wholly dry the adhering coating. A third beneficial effect of these airblasts is to substantially eliminate all pin holes in the coating. Pin holes which may, upon occasion, occur in the coated tape are attributable to one or several causes, such as failure to have the tape sufficiently clean before introducing it into the bath, although it is to be understood that a preliminary thorough cleaning is contemplated as, for example, wiping with a cloth saturated with carbon tetrachloride and drying with a clean wiper cloth. During the whole time the tape is in the bath a potential will be applied to the tape to maintain it positive with respect to both of the opposed equipotential negative electrodes between which the tape is drawn. Potentials of from 4 to 50 volts have been employed; a preferred potential used in practice is about 30 volts. A current density of 6 milliamperes per 12 square inches in the bath is utilized under this condition but the voltage and current density may be varied in accordance with other conditions in a manner which will be hereinafter discussed. The above features comprise the essentials of equipment for automatically and continuously coating tape.

A feature which has been found useful in practice is an elevator for elevating the wipers above the surface of the bath in order to insert tape therebetween and lower it again into the bath.

Another feature which has been found useful in practice is an adjustable tape guide for causing the tape to proceed directly and uniformly to the take-up reel or spool in order that an even core with uniformly spaced edges may be produced.

Opposed air jets are directed against opposite edges of the tape to redistribute the coating. Other air jets cause their streams of air to impinge upon the tape at approximately a 45-degree angle to the plane of the tape to blow excess of the solution back into the tank. Other jets have as their principal function the drying of the tape. The positioning, location and number of jets may be varied in accordance with circumstances. It has been found that drying by air jets is of considerably greater consequence in a damp atmosphere, such as might be encountered in a humid climate in the summer time, whereas in a drying atmosphere, such as is encountered in a heated building in cold weather, the drying effect of the atmosphere is almost sufficient to cause the necessary drying and under these latter conditions the number of drying jets may be reduced or the volume of air supplied for drying may be reduced.

Another feature which is convenient is a mechanism for initially setting the tape uniformly spaced between the equipotential electrodes and a continuous leveler for maintaining it uniformly spaced by automatically adjusting the take-up reel an amount equal to the thickness of the tape for each revolution of the reel. Speed control means for varying the speed of the reel as the diameter of the material thereon increases so as to maintain a substantially constant speed of travel of the tape through the bath and means for maintaining constant tension on the tape are employed.

As an auxiliary feature of the invention there may be provided a conveyor arrangement for conveying sheets or short lengths of tape through the bath while they depend from carriers on the conveyor. In using this arrangement, each sheet or tape element is placed on the conveyor manually to be carried into the bath and removed therefrom manually upon exit. The details of this arrangement will be hereinafter described.

As stated above, a feature of the invention is a core made up of tightly helically wound turns or turns wound upon a square or rectangular or other suitably shaped form to constitute a self-sustaining core because it has been found that a core of this type, prepared in accordance with the method of the invention, when heat treated, results in a structure in which the turns become tightly adherent. Such a self-sustaining core is of great value in connection with equipment in which the core is subjected to stresses which result from rapid acceleration of the apparatus in which the coil comprising the core is ultimately to be included or from other causes.

Uniformity and reproducibility of magnetic cores are highly important factors because for many applications, not only is a high packing factor required, but close tolerances are imposed within which variation in the permeability and/or total flux and/or eddy current loss of a magnetic core are limited; a feature of the invention comprises cores and methods of producing cores in which products with closer tolerances than heretofore set may be achieved or tolerances equal to those set heretofore may be achieved more rapidly in large scale production or with less skilled personnel; this is achieved as a direct result of a novel method of manufacture which comprises a feature of the invention.

It has been found that many chemical products available on the market as "silicic acid" have properties which render them defective and insufficient for the purposes of this invention. Thus, for example, certain types of material known as natural silicic acid, which types contain impurities, have proven to be relatively undesirable for the intended purpose. Among the reasons why such materials are wholly or partly unsatisfactory are that such material does not result in a satisfactory coating and that such coating operation as can be performed requires several times as much plating time. A superior product which up to the present time has been found to be fully satisfactory is a silicic acid sold by Elmer and Amend under the designation "Precipitated silicic acid T. P." in which it is understood that T. P. indicates "Tested purity." Although it may not be fully known why this product is satisfactory whereas other products are not satisfactory, it is supposed that the difference resides in the fineness of crystal form and absence of impurities.

As a first requirement the silicic acid used must be free from metallic oxides but it has been found that some products especially natural silicic acid may be free from metallic oxides and nevertheless not satisfactory. X-ray examination has shown that these materials have constituents with the structure of quartz which cannot be practically ground to a sufficiently fine state and caused to remain in suspension.

Although this material as purchased is an extremely fine product, its suitability for purposes of the present invention is increased by pouring it into acetone and grinding the silicic acid in the acetone in a ball mill for approximately 96 hours after which the coarser particles are allowed to settle out and the extremely fine particles remain in a dispersed state for a considerable period of time as a result of this process. A concentration of approximately 3 grams of silicic acid per liter of acetone has been found to give satisfactory results in practicing this method, although the concentration may be varied over a range in accordance with the principles hereinafter discussed.

As stated above, a feature of this invention comprises a self-sustaining magnetic core composed of finely divided sheet or thin tape insulated and wound into helical form. Such a core may be made by working the tape or sheet to the desired dimension, thoroughly cleaning it, and applying silicic acid to the adjacent surfaces or to one adjacent surface by simple dipping or by applying the material to a tape such as an extremely thin tape by hand by means of a camel's hair brush or other suitable means as the tape is wound on a mandrel into a core. Such a process has been and is practiced successfully in the case of tape so fragile and delicate that it cannot withstand a treatment of drawing through a bath by mechanical means. Completed magnetic cores of this type thus made may weigh no more than a few milligrams but nevertheless, after heat treating cores so prepared, they are self-sustaining to a high degree and the several turns do not slip over one another or become dislodged. Such slipping or dislodgement would result in defective and insufficient cores in that the insulation would soon be rubbed off the tape, contact would be made between the turns and the advantages of employing thin tape would be lost. Even a single slippage between turns would change the conformation of the core and, while such change persisted, would result in a core of changed characteristics. This would be detrimental to the operation of the equipment in which the core would be used, if in fact it did not render the equipment inoperative and useless.

Simple dipping referred to above has been practiced but it has been found that by means of such processes coatings of the extremely thin nature necessary to produce a high packing factor and coatings of the degree of uniformity necessary to produce cores of uniformly thin nature have not been produced. It has been found in practicing a dipping process that a much thicker suspension must be used than in the case of electrolytic deposition. This leads to the difficulty that upon removing the magnetic material from the bath in which it has been dipped the coating runs towards the bottom edge and accumulates to form a layer of non-uniform thickness in addition to which the coating is inherently thicker if the coating material be applied in such a manner as to cover the whole surface. In fact, it has been found that whereas tapes may be coated by dipping or by hand to produce a packing factor which at the best is around 25 per cent, the application of electrophoretic deposition to the same tape will result in a product in which the packing factor may be at least doubled which is indeed a very great improvement. These figures relate to cores made of tapes of a thickness of only a small fraction of 0.001 inch and as hereinbefore stated much higher packing factors may be achieved in the case of somewhat thicker tapes than in the case of very thin tapes.

It is supposed, and observations which have been made support this supposition, that in the course of electrolytic deposition of silicic acid as compared to simple dipping, the material deposited on the tape has a different degree or kind of adherence. It is indicated that the molecules or molecular aggregates deposited in the electrophoretic process have a localized position and a special kind of adherence which permits of forming a complete layer, although the ultimate layer is much thinner than it would be with simple dipping. Whatever the theoretical considerations may be, it is established that the electrophoretic operation results in cores having a higher packing factor with a given thickness of tape.

Heat treatments necessary to develop the magnetic properties of high permeability magnetic alloys of the iron-nickel type and especially those of high initial permeability and alloys of the iron-nickel-cobalt type which are characterized by a relatively high initial permeability, and great constancy of permeability, usually require the application of temperatures in a range from about 700° C. to 1000° C. and on occasion still higher temperatures of heat treatment are desired for special alloys for special purpose. Heat treating temperatures in the range of 700° C. to 1000° C. in the presence of hydrogen have been employed. Cores made in accordance with the procedure of the present invention and heat treated as described have had their laminations separated for the purpose of examining the nature of the insulating layer. Upon examining it with a microscope and using a magnification of 350 diameters the coating appears to be a uniform layer having no discrete particles which are separately observable with this magnification. However, this coating does not exhibit the characteristic properties which would be possessed by a glass or enamel coating. It may be presumed that the coating does in fact consist of discrete particles which could be individually observed if a sufficiently high magnification were available.

One characteristic feature of the present invention is that, at the temperature of heat treating employed in the annealing process, the coating material is converted to silicon dioxide $SiO_2$. It is known that the water of crystallization of silicic acid is driven off by subjecting silicic acid to the range of temperature of the annealing process leaving $SiO_2$. It is important to observe that the coating material does not appreciably react with the magnetic material under the conditions of heat treatment, namely, at the temperatures specified and in an atmosphere of nitrogen. Such reaction could produce undesirable effects and the use of coating material which engenders such reactions would not be permissible.

Previous reference was made to self-sustaining cores weighing a few milligrams. By passing thicker tape generally of the order of 0.001 to 0.002 inch in thickness through a machine for depositing silicic acid electrophoretically large self-sustaining cores weighing up to ten or more pounds have been made with packing factors in the range of 70 per cent to 94 per cent and used with complete satisfaction in apparatus subject to difficult conditions of operation.

Applicants have discovered a satisfactory manner of applying an exceedingly thin, smooth, uniform, tenacious coating of inorganic insulation to magnetic materials, particularly to continuous tapes, sheets, bands or strips of magnetic materials as well as to individual sheets or individual thin laminations of magnetic material, more especially to tapes, sheets, bands, strips or individual laminations having a thickness in the range from .00005 inch to .001 inch. The product resulting from applicants' process is not susceptible to deterioration or adverse effects at the temperatures involved in the subsequent heat treatment of the coated magnetic material, in any event at temperatures up to approximately 1000° C. The voltage breakdown point for a coating of insulation as thin as .00005 inch is satisfactory. The resulting product is homogeneous and readily reproducible if the different variables found to effect the resulting product are controlled as described herein.

In their process applicants coat highly permeable magnetic materials, particularly continuous tapes or individual sheets or laminations with a film of silicic acid by electrophoresis. The process may be applied to such materials of considerable thickness as there is no practical upper limit to the thickness of the material to which the coating may be applied. The process will be found particularly beneficial in the case of materials having a thickness in the range from .002 inch downward and it is in the coating of tapes of a thickness ranging downward from .001 inch that the benefits of reduced eddy current losses derived from the process are most pronounced. No other known process provides packing factors which makes the employment of tapes thinner than .001 inch feasible, because of the low volumetric ratios of magnetic material to total core volume which would be obtainable from such other processes. The electrophoretic coating of magnetic material, particularly of tapes and thin laminations, is the controlling reason for the further reduction of the thickness of tapes and laminations down to a thickness of one-twentieth of a mil, or .00005 inch, thus making possible a very great reduction in eddy current loss. So far as is known, the thinnest tapes or laminations ever used in magnetic cores of transformers or the like insulated by other processes is .001 inch and the best packing factor heretofore obtained with tape of .001 inch was 40 per cent. While cores of tapes or laminations of a thinness of one-twentieth of a mil insulated in accordance with the present invention are the exception, because of the infrequency with which it is necessary to specify such tapes or laminations to obtain the characteristics achievable with the present process and because of the difficulty of producing rolled magnetic strips of such thinness, as well as the difficulty of handling them after they are produced, tapes or laminations of one-quarter of a mil, .00025 inch, are, as a result of the present invention, being specified with regularity and processed successfully with satisfactory packing factors; and cores of thinner tapes down to the lower limit of .00005 inch are specified for unusual applications and are being processed with success. It is acknowledged, however, that the handling of tapes less than one-eighth of a mil, .000125 inch, in thickness is difficult on a production basis because of its fragility, although it may be processed if more than ordinary care is employed in its handling, particularly in the tensioning of the tape as it passes through the bath. For this purpose, that is, for the tensioning of tapes of all thicknesses, and particularly for the thinner tapes, a special tensioning apparatus is employed as an auxiliary feature of this invention.

The thinnest coatings applied to tapes or laminations, preparatory to the formation of a core for a transformer or the like by any of the methods and with any of the coating materials of the prior art, with all of which methods applicants are fully familiar, is 0.0008 inch. This is eight times as thick as the coatings obtainable through the practice of the present invention. The relative packing factors obtainable with such thicknesses of coatings are shown in the following table. From this table it is apparent that due to the thickness of the coating of prior art tape, applications of the coatings to tapes thinner than .001 inch resulted in such low packing factors that insufficient benefit could be derived therefrom as the volume of magnetizable material became too small relative to the total volume of the core.

| Thickness of Tape | Thickness of Coating Prior Art | Thickness of Coating Present Method | Packing Factor Prior Art | Packing Factor Present Method |
|---|---|---|---|---|
| Inches | Inches | Inches | | |
| .025 | .0008 | .0001 | .95 | .99 |
| .014 | .0008 | .0001 | .90 | .98 |
| .005 | .0008 | .0001 | .75 | .96 |
| .001 | .0008 | .0001 | .40 | .83 |
| .0005 | | .0001 | | .70 |
| .00025 | | .0001 | | .55 |
| .000125 | | .0001 | | .40 |

The invention may be understood from the following description when read with reference to the associated drawings in which:

Fig. 1 is a side elevation of a mechanism representing a first embodiment of the invention;

Fig. 2 is a side elevation of a mechanism representing a second embodiment of the invention;

Fig. 3 is a top plan of the mechanism of the second embodiment;

Fig. 4 is a left end elevation of the mechanism of the second embodiment showing the tape supply and tape tensioning mechanism;

Fig. 5 is a right end elevation of the second embodiment;

Fig. 6 is a sub-assembly showing the tape guide of the second embodiment;

Fig. 7 is an enlarged view of the full width tape as it comes from the rolling mill before longitudinal splitting of the tape into strips of desired width;

Figs. 8 and 8A show a sub-assembly of the tape tensioning mechanism of the second embodiment;

Fig. 9 is the vertical compensating means applied to the take-up reel of the second embodiment;

Fig. 10 is a tape speed indicator;

Fig. 11 is a tape core end securing means;

Fig. 11A is an enlarged detail of the tape core end securing means applied to the core outer turns;

Fig. 12 is the arrangement of air jets with respect to the tape in the second embodiment;

Figure 14:
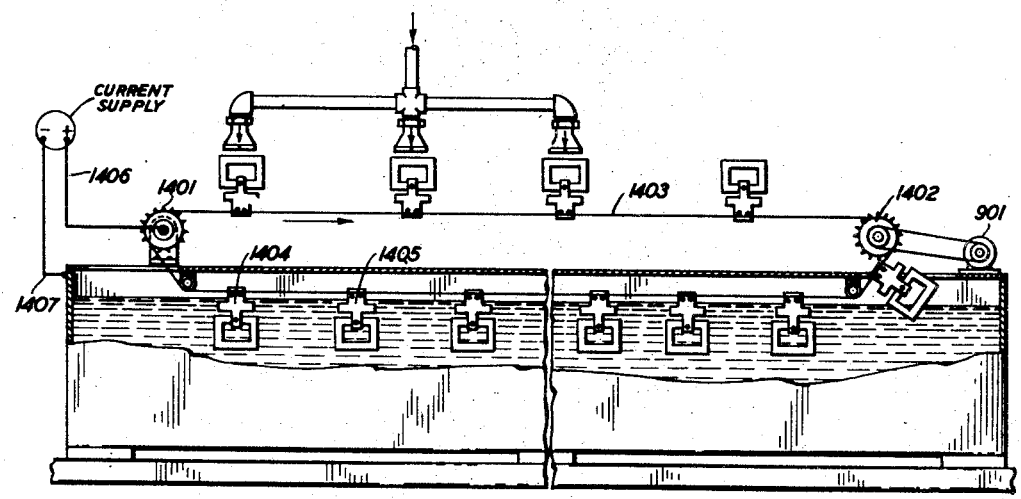
Fig. 14 is the conveyor belt arrangement for coating separate elements such as individual laminations in the second embodiment.

First, the method of producing the insulated tape will be described, and thereafter, the subsequent steps of the process necessary for producing the core itself will be described.

Refer now to Fig. 1 which shows a mechanism suitable for the continuous insulation of tape by electrophoresis.

Fig. 1 shows a supply reel A, a leveling bearing B, rotary agitators C, a lift D, for electrodes and wipers, stainless steel wipers E set in "Lavite," stainless steel electrodes F, a take-up mandrel G, a stainless steel tank H, silicic acid suspended in acetone I, a pair of opposed compressed air jets J, thin magnetic tape K, a Prony brake L, and an elongated support of U-shaped section M for the electrodes, a binding post N electrically connected to the electrodes, and a brush contact P for the magnetic tape K.

In carrying out the process of insulating the thin magnetic tape with a coating of silicic acid, the insulating solution I is first prepared. The silicic acid $H_2SiO_3$ in the form of white amorphous granules, which have no crystalline structure as has quartz, is poured into acetone in a ball mill and is prepared by ball mill grinding for approximately 96 hours. The coarser particles are allowed to settle out. Extremely fine particles of insulation remain in a dispersed state for a considerable period as a result of this process. A concentration of approximately 3 grams of silicic acid per liter in acetone has been found to give satisfactory results. Silicic acid deposits at the anode and connections are made accordingly. The metal parts in the bath are either of stainless steel or chromium plate in order to minimize oxidation of parts. The thin tape is first wound on a supply reel A. It is then carried over a leveling bearing B. The object of the leveling bearing is to direct the tape into the bath at a uniform level. Two "Lavite" bearings, in the form of half-cylinders, are secured to the lift D. The bearings are arranged so that the tape is drawn under one and over the other, through an aperture in the lift D. Secured to the lift by means of a hinge connected to its left-hand end, is an elongated member M, of chromium or stainless steel having a U-shaped section. This structure at its right-hand end rests on the right-hand end of the tank H from which it is separated by means of a strip of rubber insulation secured to the extended bottom arm of the U-shaped structure. The electrodes F are secured to the inner sides of the opposing walls of the U-shaped structure. After passing over the cylindrical surfaces of the wiper bearing E, the tape K is drawn through the elongated U-shaped structure between the opposing electrodes F and is wound onto the take-up mandrel G. The electrodes F are connected in parallel and are electrically connected to the binding post N. The brush contact P is disposed so that sliding contact may be made between it and the tape K. A source of low potential direct current voltage of the order of 22½ volts is impressed, through the members P and N, between the electrodes F and the tape K.

As the tape passes between the electrodes F, a film of silicic acid accumulates on the tape. The deposition of the silicic acid is affected to a considerable degree by the flow of suspended particles resulting from the agitation. Applicants have found that the speed of rotation of the agitators and the direction in which they are rotated, with relation to the speed and direction of movement of the tape through the bath, are important. The optimum relationship should be established by experiment for the particular case. It has been found after experimentation that probably the best results are obtainable by operating the agitators for a period just before the tape is run through the bath and stopping their operation while the tape is actually being coated, since the effect of the operation of the agitators during the running of the tape is still slightly unpredictable, notwithstanding the finding that the results obtainable are affected by the direction of rotation of the agitators as well as by their speed of operation and that there is a particular direction and speed of operation of the agitators, determinable only by experiment for each particular case, which affords the best results if they are in fact operated while the tape is running through the bath.

When the above-described method was first tried it was found that there was a tendency for the silicic acid to accumulate more on the edges of the tape than in the center. This reduced the packing factor considerably and changed the configuration of the resulting core. Applicants have found that this can be improved.

The manner in which the improvement is achieved is as follows:

Two jets connected to a source of air under pressure are arranged in opposition, one on each edge of the tape, immediately after the tape emerges from the bath and air under pressure is directed in such a manner that the excess of silicic acid, which has accumulated along the edges of the tape, is blown toward the center of the tape, so as to form a thin coating of more uniform thickness.

It is important that the coils should be subjected to a minimum of handling. The take-up mechanism G, is accordingly arranged, in any suitable manner, so that it will accommodate mandrels of different shapes and sized to conform to the inner shapes and sizes of the required coils. Before the insulated tape is wound onto a mandrel, the mandrel is covered with a layer or two of paper. The coil is then wound onto the mandrel. The take-up mechanism is also equipped with a revolution counter (not shown) so that the number of turns which are wound onto the mandrel may be regulated as required. After the proper number of turns have been wound onto the mandrel, the mandrel is removed. Next, the free end of the tape is secured in any suitable manner and the coil is annealed.

In the annealing process, the layer of paper between the mandrel and the innermost turn of the coil is burned, freeing the coil so that it may be readily removed.

Attention is now particularly called to the second embodiment of the invention, exemplified in Figs. 2 to 14. This embodiment represents and incorporates the principles and functions of the embodiment of Fig. 1 and includes also refinements, safeguards and controls auxiliary to the embodiment of Fig. 1 to achieve the objectives of the present invention.

In the second embodiment the fundamental operation is the same as in the first embodiment. That is to say, magnetic tape wound on a supply reel is drawn through a tank having therein a suspension of finely divided silicic acid suspended in acetone. The silicic acid is first prepared by ball mill grinding in the manner described above. The tape on entering the tank is drawn through apparatus performing the same general functions in the same order as described for the embodiment per Fig. 1. That is to say, it is first drawn through the top and bottom wipers and then through the apertures separating the two equipotential surfaces or electrodes. It is taken up on a take-up reel.

It has been found in practicing the invention that, if exceedingly thin uniform coatings and cores of high packing factor are to be obtained, or, if in fact coatings of any thickness and cores of any particular packing factor, both within exceedingly close tolerances, are to be obtained, it is necessary to control every variable which is associated with the process. The various factors which affect the uniformity and reproducibility of the cores and the preferred method of the control of each factor will now be described.

It is first of all essential in order to obtain uniformity and stability of flux that the components of the magnetic material, that is, the relative amounts of iron, nickel, cobalt, etc., be fixed within prescribed limits for the particular core application. The considerations governing the choice of the various percentages of the constituents of the metallic material are well known in the art. Starting with a particular chosen alloy, the first variable that has been discovered to affect the result and for which a control has been devised as an auxiliary feature of the present invention is the product of the rolling of the magnetic material.

The magnetic material is rolled to the required thinness in a rolling mill. A mill known in the art as a Heraeus Vacuumschmelze 20 High Mill has been found to give satisfactory results. It had formerly been generally assumed that the cross-section of the resulting rolled magnetic tape was sufficiently rectangular in cross-section to insure desired results. Such assumption for most purposes to which the product of such a rolling mill is applied is justified. However, applicants observed an unusual phenomenon in the operation of the take-up reel on which the magnetic material is wound after emergence from the bath. During the reeling of certain rolls, the tape had a tendency to drift in one direction. During the reeling of other rolls the tape had a tendency to drift in the opposite direction. At other times there was no observable drift. The conformation of the cores obtained when drift was observed was not regular. This irregularity was more pronounced in the case of a core requiring a large number of turns. The greater the number of turns, the greater the irregularity. The thicknesses of tapes in the reeling of which drift was observed was measured, but it was difficult, due largely to the thinness of the tape and the minute amount of the variation, to detent any differences in thickness at various transverse positions. Examination under the microscope, however, disclosed the source of the difficulty and this will be explained with reference to Fig. 7.

Fig. 7 is a sketch of a cross-section of a rolled tape as it comes from the rolling mill. In Fig. 7 variations from rectangularity of the section are greatly enlarged for purpose of explanation. Cores may be of various widths. However, usually the tape as produced in the rolling mill is several times as wide as required for the average core. In the usual core, the product of a single rolling is split parallel with its edges into three separate strands, such as 701, 702 and 703. The middle strand 702 is quite uniform in thickness. The two outer strands, however, are of varying section. Strand 701 is thinner at its left-hand edge than at its right-hand edge. Strand 703 is thinner at its right-hand edge than at its left-hand edge. Further, when each of the strands has the same width, the area of the cross-section of strand 701 or of strand 703 is each minutely less than the area of the cross-section of strand 702.

As a result of a knowledge of the variations in the strands of tape, it is learned that care is necesasry in the selection of the strands when working to close tolerances. Even though the variations in thickness and conformation of sections are exceedingly slight and not indicated in a single strand by measuring methods of some refinement, nevertheless their cumulative effect when wound into cores of many turns will make differences which affect the results obtainable. For uniformity of product, when close tolerances are required, it is essential that strands from the same position in the roll be used. It is generally advisable to use the center strand of a rolling and preferably in order to obtain uniform coils of a particular size for a particular purpose to use succeeding sections of the center strand.

To facilitate the foregoing, particularly in the case of thin tapes, long continuous strands from the center of particular rollings are wound on storage reels. Successive equal length sections from the reel are measured to a fraction of an inch to serve in cores where uniformity to close tolerance is required.

To counteract the effect of drift in reeling, particularly in the case of the strands, such as 701 and 703, a tape guide, shown in Fig. 6, has been devised as a feature of this invention.

Refer now to Figs. 2, 3, 4 and 5.

Fig. 2 shows the front elevation, Fig. 3 the top plan, Fig. 4 the left elevation and Fig. 5 the right elevation of the tape coating mechanism of the second embodiment of the invention. The second embodiment includes apparatus performing each of the functions performed by the apparatus per Fig. 1, which is readily identifiable from the foregoing description plus additional apparatus. This additional apparatus may be operated to insure the obtaining of high and uniform packing factors in cores using thinner tape than has heretofore been possible thus providing cores of transformers, etc., of higher quality than heretofore obtainable in the art.

The added apparatus performing functions not included in the embodiment per Fig. 1 is separable into units and each will be described separately.

One of these units is the tape tensioning apparatus assembly 800 which is applied to the tape supply reel, shown at the left of Fig. 2 and in Fig. 4. The tape tensioning apparatus is shown in detail in Figs. 8 and 8A which are described below.

Another apparatus assembly unit of the second embodiment is the tape guide assembly unit 600 shown in the upper right-hand portion of Fig. 2. The tape guide assembly is shown in detail in Fig. 6, which is described hereinafter.

Another apparatus assembly unit of the second embodiment is the tape supply reel compensating mechanism 900 for maintaining the tape at a constant level. This is shown in the right-hand portion of Fig. 2 and in Fig. 5. It is shown in detail in Fig. 9 which is described below.

Another apparatus assembly unit is the air jet assembly 1200 which performs the function of redistributing the excess coating, covering uncoated pin-hole-size areas, blowing the excess solution back into the tank and drying the tape. Because of the congestion of apparatus on the top of the tank it was not possible to show all of the air jets and for this reason jets directed at the bottom of the tape have been omitted. The proper physical relationship of the jets is shown, however, in Fig. 12 which is described in detail hereinafter.

The tank in which the silicic acid is suspended is located in the upper portion of the table assembly 200. Six stirrers or agitators are provided spaced in two rows of three each, such as 201 to 203, along the length of the tank. The stirrers may be driven in any convenient manner. They may be equipped individually with small motors or they may be driven from a common motor source through a common or individual friction or other drives.

The elevator 204 is employed in the same manner as in the first embodiment described in the forgoing. Its function is to support the top and bottom tape wipers and to support the U-shaped electrode assembly which is hinged to the elevator 204 in the same manner as described above for the first embodiment. Potential is applied between the two equipotential electrodes and the tape through a connecting terminal 220 on the elevator which is connected in parallel to the two electrodes and a tape wiping connection 225.

The electrical apparatus for control of the motor 901 as well as for applying proper potentials between the tape and the equipotential electrodes will differ widely according to the electric power supply. Casings 215 and 216 and compartment 217 shown in Fig. 5 house the power apparatus and controls for the motor 901 and the stirring mechanism as well as for the potential applied between the tape and the equipotential electrodes. The tape is ordinarily passed through the bath at a rate of 25 feet per minute but the speed controls should be such as to provide a speed range of from 5 feet to 100 feet per minute. The slow speeds provide thicker coatings than the usual 0.0001 inch and the faster speed thinner coatings when suitable.

Figure 13:
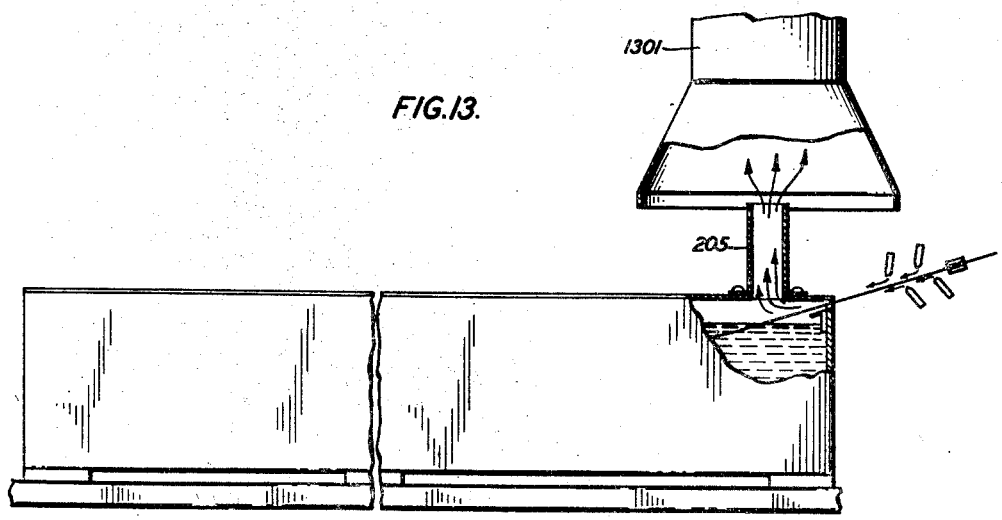
Fig. 13 is the arrangement for relieving accumulated air pressure in the tank in the second embodiment.

The top of the tank is provided with a cover 210. It has been found that as a result of the effect of the air pressure from the jets, whose function it is to blow the excess solution back into the tank, that when the tank cover is closed air pressure tends to build up within the tank, which agitates the solution excessively and affects the results. In order to obviate this effect a vent 205 is provided at the right-hand end of the tank as shown in Figs. 2 and 13. The vent is in close proximity with the air jets and prevents the building up of pressure, due to the effect of the air jets, within the tank. The vent communicates with a hood 1301 shown in Fig. 13. The hood is connected in turn to an exhaust fan or the like, not shown. This draws off any objectionable fumes which may come from the vent.

The space beneath the table top which is not employed for the housing of the mechanism of the second embodiment may be separated conveniently into compartments as indicated for the storage of associated apparatus such as the required sets of change gears for different tape thicknesses, etc.

Refer now to Fig. 6 which shows the tape guide. The tape 601 covered with insulation 602 as it emerges from the bath is directed onto the take-up reel by means of the structure per Fig. 6. The right-hand vertical plate 603 is secured in position adjacent the left-hand face of the shoulder of the L-shaped member 605. The left-hand vertical plate 604 is secured to the left-hand end of bar 606. The bar is adjustable slidably in bearing 607 in the L-shaped member. The bar 606 may be locked in position by means of wing screw 608. The bars 603 and 604 are thus separable and adjustable to different spacings for different widths of tape 601.

The left-hand end of L-shaped member 605 is rigidly secured to the top of slidable vertical rod 610 which fits in a vertical boring in head 611. The assembly described in the foregoing may be adjusted and secured in its vertical position as well as in its position of rotation about the center of vertical rod 610 by means of screw 612. The lateral position of head 611 may be fixed by means of micrometer screw 613 which is supported in head 611. Bearing 614 is rigidly secured in a saddle in bar 615. The head is supported on a platform 616 which slides laterally in V guides in horizontal support 617. The horizontal support 617 is in turn rigidly secured to block assembly 618 through bolts 619. The block assembly 618 is adapted to slide longitudinally in V guides 620 under control of hand screw 621. The entire tape guide assembly is secured to the top of the tank, adjacent the take-up reel, by bolts which project through openings 622 in the bottom of the V guide 620.

By means of the tape guide assembly described in the foregoing it is possible to adjust the position of the tape 601, as it is fed to the reel, with precision. Due to the provision for rotational adjustment of the L-shaped element it is possible to impart a cant to the tape in one direction or the other so that it is fed to the take-up reel in a manner to compensate for the tendency of the tape to drift in one direction or the other. This promotes uniformity in and high ratios of packing factor. An advantage of the tape guide is that the tendency of the insulation to wear off the edge of the tape and a tendency of the tape to pucker and abraid on the side toward which its drifts is overcome.

Refer now to Fig. 10. This figure shows the tape speed control of the present invention.

It has been found that it is necessary to control the tape speed within very close limits if uniformity of product and close tolerances are to be maintained. Various speed indicators were tried to perform this function and they were found objectionable principally because of lag between the indicator and the actual tape speed.

The tape speed indicatator devised by applicants as an ancillary feature of this invention, is shown in Fig. 10. In this figure a wheel 1001, preferably light in weight, and having its periphery covered with rubber, engages the tape as it passes over a roller 1006 after being drawn off the supply roll. The wheel 1001 is rigidly secured to the left-hand end of a shaft 1002. Secured to the right-hand end of the shaft is the armature (not shown) of a miniature generator 1003. The generator output is connected through conductor 1004 to meter 1005. The meter is graduated to indicate tape speed in feet per minute.

With this arrangement the instantaneous tape speed reading is correct. Lag in the indication is eliminated. The speed of the tape may be adjusted or initially set manually by controlling the tape motor drive.

Refer now to Figs. 11 and 11A which show the means for insuring the formation of the core into a compact unitary structure.

It has been mentioned in the foregoing that in order to insure stability of flux it is necessary to prevent the slippage of even a single turn of the insulated tape upon another. Displacement of the turns would be fatal where uniformity is essential as it would change the flux path. Various methods were tried and one which effects the desired result is as follows.

A transverse section of the inner surface, approximately one-quarter inch in length, at the end of the tape is cleaned of insulation. A section of the outer surface of the succeeding turn in radial alignment with the first cleaned section and of corresponding length is also cleaned of insulation so that the bare surfaces of the tape are in engagement.

A lavite wedge, or compression element, 1101 is placed in radial alignment over the bared surfaces. A strand of wire 1102 is passed over the external layer of the coil and the lavite wedge 1101. The ends of wire are twisted together to apply pressure between the wedge and the cleaned surfaces.

When the core is subjected to heat treatment the bared surfaces weld together. It has been found that when the core is subjected to heat treatment the insulating layers coalesce and the core becomes a solid unitary structure. This insures stability and permanence of magnetic flux values. The heat treatment of the unitary cores is carried out at such a temperature that the coating of silicic acid is changed to a coating of $SiO_2$ in amorphous form. No crystalline structure characteristic of quartz is observable at magnifications of 350 diameters. Further glass is not formed.

Refer now to Fig. 12 which shows the arrangement of air pressure jets in relation to the tape.

The most essential function of the air jets is performed by the opposed jets 1201 and 1202. These jets direct an air stream at the opposite edges of the tape. It has been found, notwithstanding the fact that the equipotential electrode surfaces through which the tape passes in large degree overcomes edge effect, or accumulation of insulation along and near the edges of the tape, there is, nevertheless, a variation in thickness of the insulation. It is true that by the use of equipotential surfaces, that is to say, means for insuring an equal potential gradient between the opposed electrodes and all points of the tape, the deposits of insulation are generally equalized, nevertheless, where very close tolerances are required equipotential surfaces are not sufficient. For this reason something further is necessary and the opposed air jets which redistribute the insulation are an important feature of the present invention. Without this feature it is impossible to achieve uniformity of coatings when variations of approximately one-twentieth thousandth of an inch or less are of importance. With opposed air jets such as 1201 and 1202 which apply air pressure immediately after the coated tape emerges from the bath, and before the coating has set, it is possible to redistribute the agglomerations near the edges and to achieve a practically uniform coating.

The function of the jets 1203 and 1204 is primarily to blow the excess liquid and coating which is carried out of the bath mechanically, back into the bath.

All of the jets, however, cooperate in performing another important function, namely, the covering of pin-hole areas which would otherwise remain bare of insulation. This reduces eddy current loss and promotes uniformity.

Another variable which affects the results in an important way, especially when tapes of less than one thousandth of an inch are employed and variations in coatings of one-ten thousandth of an inch and less are of importance, to insure uniform packing factors, is the tension applied to the tape. Why this is so is not entirely clear. But it has been found to affect the results. To obtain uniform packing factors it has been found essential to apply uniform tension to the tape. By this is meant that the tension should not vary from run to run and should not vary during a run. To insure uniform tensioning from run to run as well as during runs a special apparatus has been devised which constitutes another ancillary feature of the present invention.

Refer now to Figs. 8 and 8A which show the tensioning apparatus of this invention. This apparatus is designed to insure uniformity of tape tension from run to run and during a particular run.

Figs. 8 and 8A show views taken on opposite sides of the tensioning apparatus. The essential function of this apparatus is to apply uniform tension to the tapes at all times, notwithstanding variations in the amount of tape on the supply reel.

The mechanism shown in Figs. 8 and 8A constitutes essentially a prony brake with an arrangement for compensating for variations in tension due to differences in the amount of tape on the reel.

A brake band 801, Fig. 8A, is secured at its right-hand end by means of a bolt 802 to a horizontal arm 803. The band passes over a drum 804 on shaft 805. The supply reel 806 is mounted on shaft 805. The lower end of the brake band 801 is attached to the upper end of spring balance 807. The lower end of the spring balance is connected through element 808 to one of the series of openings in lever arm 809. The left-hand end of lever arm 809 is arranged to rotate shaft 810 to which it is rigidly secured. Eccentric weight 811 is also rigidly secured to shaft 810. Lever arm 812 is also rigidly secured at its lower end to shaft 810. The upper end of lever arm 812 carries a roller 813 which bears against the surface of the tape 814 on the supply reel. When there is a large amount of tape on the reel, reference to Fig. 8 shows that the upper end of lever 812 will be urged to the left. Lever arm 809 will also be urged to the left. However, the eccentric weight 811 will be displaced so that its center of gravity will be in such position to the right of the shaft 810 as to exercise a compensating effect on the balance 807. When the supply of tape on reel 806 is small, lever 812, as shown in Fig. 8, will rotate counter-clockwise, as will shaft 810 carrying with it lever 809. Eccentric weight 811 will also be rotated so that its center of gravity is closer to the center of shaft 810.

In effect, therefore, when the supply of tape on the supply reel is large the effect of the eccentric weight is large. When the supply of tape is small the effect of the eccentric weight is small. Constant tension is applied to the brake band 801 whatever the supply of tape on the reel.

It has been found that it is essential to maintain the position of the tape constant relative to the position of the equi-potential electrodes if uniformity of results are to be obtained. If the spacing of the tape and the electrodes is changed, variable thickness of coatings on the opposed surfaces will result. In order to maintain the position of the tape constant relative to the electrodes, in accordance with the present invention, means are provided to constantly lower the position of the take-up reel as layers of tape are added thereto. The mechanism for performing this function will now be explained.

Refer now to Fig. 9 which shows motor 901 connected to a speed regulator 902. Speed regulator 902 may be of the type known as a "Speed Ranger" manufactured by the Master Electric Company of Dayton, Ohio. Hand wheel 903 controls the speed regulator 902 through shafts 904, 905, 906 and bevel gears 907 and 908. The output shaft of the speed regulator 902 carries sprocket 909 which drives chain 910. Chain 910 drives sprocket 922 which in turn drives chain 911. Chain 911 drives sprocket 912 to which is coupled take-up reel 913. Take-up reel 913 is mounted on a carriage 914 which is supported on worm 915 which in turn is coupled through clutch 916 to gear box 917. Gear box 917 is driven through change speed gears 918 by means of sprocket 919 and chain 920 from sprocket 921 also carried by the output shaft of motor speed regulator 902. Worm 915 when rotated serves to lower carriage 914 and the take-up reel 913 to compensate for the thickness of the layers of tape plus insulation as they are taken up by the reel.

The starting and stopping of the tape take-up reel and tape thickness compensating mechanism drive is under control of a clutch mechanism shown in Fig. 5 comprising a knob 924 which is connected by means of a bar 925 to the left-hand end of a lever 926 which is pivoted at 927, at the lower end of vertical fulcrum 929. The right-hand end of the lever is bifurcated to accommodate a channel in clutch driven member 928 which member is slidably mounted on vertical shaft 915, so that it has limited movement in a vertical direction only with respect to shaft 915. The lower end of member 928 is serrated to engage corresponding serrations in the driving member of the clutch 916. The driven member 928 of the clutch assembly is normally urged into engagement with the lower or driving member 916 under the influence of spring 931 which is compressed between fixed collar 932 mounted on shaft 915 and the slidable clutch driven member 928. When driving member 916 rotates while in engagement with driven member 928 the shaft 915 rotates. When knob 924 is depressed driven member 928 is raised against the influence of spring 931 and vertical movement of carriage 914 and rotation of the tape take-up reel ceases. The adjustment of the carriage at the start of operations or as necessary may also be effected by operating hand wheel 923.

Change gears 918 are interchangeable in pairs to provide different rates of lowering of the carriage for different thicknesses of tape plus insulation being accumulated on reel 913 for different runs.

It is particularly pointed out that this compensation is continuous. The level of the tape in its relation to the constant potential electrodes never changes.

The constant potential electrodes are considerably wider than the widest tape which is coated. Both edges of both electrodes extend for a considerable distance beyond both edges of the tape being coated. This together with the very close spacing of the tape and the electrodes and the means described above for maintaining the small separations, between the surfaces of the tape and the opposed surfaces of the electrodes, uniform all contributes to obtaining uniform coating.

It is particularly pointed out that the above provisions would be completely effective to provide uniformity of coatings and to eliminate edge effect for most coating purposes. Where, however, as in the present instance the objective is to obtain uniformity of coatings of such thinness within such very close tolerances all advantages obtainable through the maintenance of a uniform potential gradient between the tape and the electrodes have been found to be insufficient and for this reason in addition to the means for insuring a uniform potential gradient, the redistribution of the coating by means of the opposed air jets which blow the small excess edge accumulation toward the center of the tape has been found to achieve more effectively the desired results.

Refer now to Fig. 14 which shows an arrangement for coating individual elements such as thin sheets or laminations.

In this arrangement a continuous flexible link chain 1403 such as a bicycle chain, forming a closed loop, interconnects a driving sprocket 1402 and an idling sprocket 1401, mounted on separate shafts. A suitable driving element is connected from the motor 901 to the driving shaft. Spaced along the chain at regular intervals and rigidly secured to individual links thereof are individual spring clamps such as 1404 and 1405. The individual sheets or laminations are inserted between the jaws of the clamps such as 1404 and 1405. The position of the chain and sprocket assembly is so fixed with respect to the bath that the individual elements are immersed in the bath as they traverse the lower half of their orbits when the chain is in motion. At other times while the elements traverse the upper half of their orbits the laminations or elements are withdrawn from the bath. It is pointed out that the positions of the individual elements is such that they are edgewise as they traverse the bath. Positive potential is applied to the individual elements through a contact 1406 which engages the idler shaft, and a negative electrode 1407 which connects to the tank.

It is not possible in the operation of this chain mechanism to coat the individual laminations or elements to the degree of uniformity achieved in the coating of tape as described above.

Where it is essential that individual laminations be coated with uniformity within close tolerances it is recommended that the coating first be applied to continuous strips of the width of the required laminations in accordance with the method described above for tapes and then that the laminations be cut to length from the coated strips. In this case care much be taken to remove burrs, etc., which would otherwise puncture the insulation and afford paths for eddy currents. The reels, equipotential electrodes and other apparatus will necessarily be widened to accommodate continuous sheets.

It is particularly pointed out that there is no practical limit to the width of bands or continuous sheets which may be coated in accordance with the method of this invention. It is essential where uniformity of thin coating within very close tolerances is required that the opposed equipotential electrodes between which the tape or band or continuous sheets are drawn be considerably wider than the tape or sheet or band and be closely and uniformly spaced and that the uniformity of spacing be maintained. Further it is essential that the tape or band or continuous sheet be fixed in such transverse position that it is centrally located with respect to the overlapping edges of the wider electrodes. Further, it is necessary that the very small excess coatings which are nevertheless deposited along the edges be subjected to the redistributing jets as described in the foregoing.

The individual laminations after the coating has been applied are assembled or stacked in compact units and are then heat treated to achieve the required permeability and to form the laminated core into rigid unitary structures through the coalescing of the contiguous insulating coatings.

What is claimed is:

1. A high permeability low loss magnetic core having a ratio of thickness of metal to thickness of separator between metal of approximately four to one, said core comprising a coiled magnetic tape, said tape having a thickness less than .001 inch, said tape having, for the purpose of securing the aforesaid high ratio an exceedingly thin electrophoretically applied coating of silicic acid to reduce the adverse effects of eddy currents.

2. An electromagnetic core, said core comprising a coiled tape of magnetic material, said tape having a thickness not exceeding .001 inch, said tape having a coating on its adjacent surfaces, said coating having the characteristics resulting from forming it electrophoretically with silicic acid whereby the core as a whole has a minimum eddy current loss and a high ratio of volume of magnetic material to total volume.

3. A core for use as the magnetic core of an electric coil comprised of high permeability alloy of iron in the form of tape, said tape having a thickness not exceeding .001 inch, said tape having an electrophoretic coating of silicic acid, said core having a total volumetric ratio of alloy to alloy plus coating above 75 per cent.

4. In the manufacture of flat insulated magnetic tape for use in magnetic cores, depositing fine colloidal silicic acid, unmixed with any other substance, electrophoretically on a magnetic tape from a suspension thereof in acetone, with said tape the anode, while maintaining an equal potential between all portions of the surface of said tape and opposed electrodes, said silicic acid obtained from grinding highly pure precipitated silicic acid, to form a coating of insulating material, subjecting said tape freshly coated with said material as it emerges from the bath to opposed streams of air under pressure, directed at the opposed edges of said tape, to redistribute the silicic acid evenly to obtain a higher ratio of magnetic material to coating material in the completed core.

5. A process for producing magnetic cores formed of wound turns of thin flat magnetic tape for use in high frequency low loss magnetic cores, to minimize the adverse effect of eddy currents and to provide a high ratio of the volume of magnetic material to total core volume which comprises: (1) coating said tape electrophoretically with chemically pure, precipitated colloidally fine, silicic acid, unmixed with other substances, in a bath comprising a suspension of said acid in acetone while maintaining a uniform potential gradient during the coating process between the flat surface to be coated and an opposed flat electrode substantially wider than said tape and projecting equal distances beyond the edges of said tapes; (2) passing said tape so coated, immediately after it emerges from the bath through a stream of gas under pressure so disposed as to redistribute the coating more evenly by removing from the edges an excess formed incident to the electrophoretic process; (3) winding said tape so as to form a magnetic core.

6. A process for manufacture of magnetic cores for high quality transformers, to provide a high ratio of the volume of magnetic material to total core volume and to promote low eddy current losses: (1) covering a wound flat thin magnetic tape, having a thickness of less than .001 inch, electrophoretically with a coating of chemically pure, precipitated, colloidally fine, silicic acid, unmixed with other substances, said coating having a thickness of approximately .0001 inch on the top and bottom of said tape by drawing said flat tape continuously past and parallel to a substantially wider flat electrode, each of the opposed edges of which electrode substantially overlap the opposed edges of said tape, while maintaining an equipotential gradient between the surface of said tape and the opposed surface of said electrode; (2) subjecting said tape so coated, immediately after said coating, to a stream of gas under pressure so as to redistribute said coating more evenly; (3) winding said tape having said coating so redistributed so as to form a magnetic core.

7. A magnetic core of a transformer comprising a tape of magnetic material wound into the form of a toroidal coil, said material having an electrophoretically applied coating of chemically pure colloidally fine silicic acid of a thickness less than 0.00025 inch to minimize the energy loss due to eddy currents at high frequencies.

8. As steps in the manufacture of magnetic cores of high permeability to minimize the eddy current energy loss and increase the effective permeability by increasing the packing factor: (1) covering a flat magnetic tape electrophoretically with an insulating coating consisting of chemically pure colloidally fine precipitated $H_2SiO_3$, unmixed with other substances, from a suspension thereof in an organic solvent while maintaining an equipotential gradient between said flat tape and the opposed surface of a flat electrode substantially overlapping the opposed edges of said tape; (2) winding the insulated tape into a toroidal coil; (3) baking to a point in the range from 700° C. to 1000° C. in an atmosphere of hydrogen to heat treat the material, remove the solvent and consolidate the cores.

9. An electrophoretic process adapted to deposit silicic acid on a thin flat magnetic tape with uniform thickness on edges and center of tape which comprises passing the tape in a continuous strip through a colloidal suspension of chemically pure precipitated $H_2SiO_3$, unmixed with any other substance, in acetone, making the tape an anode for the passage of current while in the bath, maintaining an equipotential gradient between the broad surface of the tape and the opposed surface of a flat electrode substantially wider than said tape, said electrode projecting equal distances beyond each of the opposed edges of said tape withdrawing the tape from the bath, and immediately subjecting it to opposed air blasts, directed at the opposed edges of said tape, to redistribute the coating to eliminate extra thickness upon the edges due to edge effects during coating so as to form a thin even uniform coating.

10. A magnetic core composed of laminations of highly magnetic flat tape or flat sheet metal, of thickness less than 0.001 inch, said laminations having a continuous coating over their surfaces, said coating applied to said laminations by cataphoresis, said coating forming a union between adjacent laminations, said coating being capable of withstanding voltages tending to set up current flow from lamination to lamination, the coating consisting essentially of $SiO_2$ distributed uniformly and of such thickness that the total volumetric ratio of metal to coating plus metal is as high or higher than 75 per cent.

11. A pancake type electromagnetic core in which all the turns are sufficiently adherent each to the other to constitute a solid self-supporting core structure composed of successive turns of stress or strain sensitive magnetic tape material of high permeability, an adherence producing and insulating layer less than 0.0008 inch in thickness between said turns, said layer consisting of a continuous uniform cataphoretic deposit of chemically pure colloidally fine silicic acid.

12. A magnetic core composed of laminations of ferromagnetic material which is capable of being rendered highly permeable at low flux densities approaching zero, said laminations having insulation separators, said separators formed of a cataphoretic deposit of highly pure colloidally fine silicic acid, said core being rigidly bound by coalescence between said laminations and said insulation separators.

13. The process of manufacture of a magnetic core which comprises coating thin layers of magnetic material by depositing thereupon an electrophoretically thin layer of highly pure colloidally fine precipitated silicic acid, unmixed with other substances, from a suspension in a readily vaporizable medium which evaporates at elevated temperatures in the presence of hydrogen without impairing the properties of or reacting with the magnetic material, juxtaposing the layers to form a core, and then heat treating the mass of layers to a point in the range between 700° C. to 1000° C. in an atmosphere of hydrogen to develop the permeability of the material.

14. In the manufacture of a magnetic core for use as a transformer, impulse producer or similar purposes the method of applying an electrophoretic insulation to a continuous flat strip of magnetic material, said strip having a thickness of .001 inch or less, to insure coatings of approximately .0001 inch of uniform thickness within close tolerance and of forming said coated tape into said core which comprises: (1) coating said strip electrophoretically by applying a potential between said strip and a fixed plate electrode in a colloidal suspension of highly pure precipitated silicic acid unmixed with any other substance, said plate having a width substantially wider than the width of said strip; (2) drawing said strip past said electrode parallel to said electrode in such manner that the opposed edges of said strip are maintained equidistant to the parallel edges of said wider electrode, to maintain a uniform potential gradient between the center of said strip and said electrode and each of the opposed edges of said strip and said electrode; (3) maintaining a uniform and equal and close spacing between all portions of the surface of said strip and the opposing surface of said electrode; (4) running said coated strip directly to a supporting take-up reel after said strip passes said electrode and continuously adjusting the level of said reel to compensate for the accumulation of said coated strip thereon, so as to maintain uniform spacing and uniform potential between the surface of said strip and the opposed surface of said electrode at all times; (5) directing a stream of gas under pressure at the opposed edges of said coated strip, after coating and before winding on said reel, to direct excess of insulating coating deposited along the edges of said strip toward the center of said strip, to redistribute said excess more evenly and to cover random uncovered pinhole areas with said insulation.

15. The method of making a magnetic core which comprises electrophoretically depositing upon a length of magnetic tape colloidal pure precipitated silicic acid, unmixed with any other substance, from a suspension thereof in a liquid, taking up the tape upon a reel, heat treating the tape in the physical form produced by taking it up upon the reel to a temperature in the range from 700° C. to 1000° C. used in annealing magnetic materials to restore or improve their magnetic properties, unreeling the tape from the reel and winding some portion of it into a core of the pancake or helix type, securing the ends thereof in place, and reheating to a temperature as aforesaid.

16. In the continuous electrophoretic coating of a flat moving strip of metallic material, to obtain thin coatings of uniform thickness within close tolerances by cataphoretic deposition on said strip from a solution containing in suspension a material to form said coating, a take-up reel to which said strip passes directly from said suspension for storing said strip when coated, an elongated electrode having its longitudinal axis in the direction of movement of said strip, said electrode substantially wider than said strip and parallel to said strip, the opposed longitudinal edges of said electrode extending an equal distance beyond said strip on each side of said strip, means for maintaining a potential between said electrode and said strip, and a continuous leveler for maintaining uniform spacing between said strip and said electrode to maintain a uniform potential gradient between said electrode and said strip incident to variation in quantity of said strip on said take-up reel, and air blast jets directed at the opposed longitudinal edges of said strip so as to overcome electrophoretic coating edge effect.

17. In the continuous electrophoretic coating of a flat moving strip of metallic material, to obtain thin coatings of uniform thickness within close tolerances from a colloidal suspension of insulation forming material, in combination, a pair of opposed electrodes in said suspension, each of said electrodes wider than said strip, a fixed support and an adjustable take-up reel for said strip, for centering said strip laterally and vertically between said electrodes so as to initially obtain a uniform potential gradient between all portions of each of the opposed surfaces of said moving strip and said pair of electrodes, means for automatically compensating for accumulations of said strip on said take-up reel to maintain said gradient uniform by causing relative movement between said take-up reel and said electrodes and opposed jets for directing air blasts at the opposed edges of said strip near the point of emergence of said strip from said suspension to counteract edge effect.

18. A magnetic core of a transformer comprising a tape of magnetic material, said material having a thickness not exceeding 0.001 inch, wound into the form of a toroidal coil, said material having an electrophoretically applied even coating of chemically pure colloidally fine silicic acid of a thickness less than 0.00025 inch to minimize the energy loss due to eddy currents at high frequencies.

19. A pancake-type electromagnetic core composed of successive turns of stress or strain sensitive flat magnetic tape material of high permeability, in which all of the turns are sufficiently adherent each to the other to constitute a solid self-supporting core structure, said flat tape material having a thickness not exceeding 0.001 inch, an adherence producing and insulating layer less than 0.0008 inch in thickness between said turns, said layer consisting of a continuous cataphoretic deposit of chemically pure colloidally fine silicic acid, said layer characterized by uniform thickness by the elimination of cataphoretic edge effect on flat tapes.

20. A magnetic core composed of laminations of ferromagnetic material which is capable of being rendered highly permeable at low flux densities approaching zero, said laminations not exceeding 0.001 inch in thickness, said laminations having insulation separators, said separators being formed of a continuous uniformly thin cataphoretic layer of highly pure colloidally fine silicic acid, said core being rigidly bound by coalescence between said laminations and said insulation separators.

21. As steps in the manufacture of a magnetic core of high permeability to minimize eddy current energy loss and increase the effective permeability by increasing the packing factor: (1) covering a flat magnetic tape electrophoretically uniformly with an insulating coating consisting of chemically pure colloidally fine precipitated $H_2SiO_3$, unmixed with other substance, from a suspension thereof in an organic solvent, while maintaining an equipotential gradient between said flat tape and the opposed surface of a flat electrode substantially overlapping the opposed edges of said tape; (2) winding the insulated tape into a toroidal coil.

KENNETH G. COMPTON.
HAROLD L. B. GOULD.

REFERENCES CITED

The following references are of record in the file of this patent:

UNITED STATES PATENTS

| Number | Name | Date |
|---|---|---|
| 1,065,090 | Werth | June 17, 1913 |
| 1,720,943 | Chapman | July 16, 1929 |
| 1,897,902 | Harsanyi | Feb. 14, 1933 |
| 1,899,591 | Segar | Feb. 28, 1933 |
| 2,214,876 | Clark | Sept. 17, 1940 |
| 2,221,983 | Mayer et al. | Nov. 19, 1940 |
| 2,222,195 | Elsey | Nov. 19, 1940 |
| 2,236,861 | Widell | Apr. 1, 1941 |
| 2,238,667 | Wales | Apr. 15, 1941 |
| 2,261,983 | Ford | Nov. 11, 1941 |
| 2,293,951 | Seastone et al. | Aug. 25, 1942 |
| 2,321,439 | Verwey et al. | June 8, 1943 |
| 2,342,850 | Ferm | Feb. 29, 1944 |
| 2,372,074 | Ford | Mar. 20, 1945 |
| 2,406,820 | Fisher et al. | Sept. 3, 1946 |
| 2,501,846 | Gifford | Mar. 28, 1950 |

FOREIGN PATENTS

| Number | Country | Date |
|---|---|---|
| 289,509 | Great Britain | Nov. 23, 1927 |
| 393,869 | Great Britain | June 15, 1933 |
| 836,077 | France | Oct. 10, 1938 |